United States Patent
Barattini et al.

(10) Patent No.: US 11,745,704 B2
(45) Date of Patent: Sep. 5, 2023

(54) FOLDING WHEEL CHOCK FOR INDUSTRIAL AND/OR COMMERCIAL VEHICLES

(71) Applicant: TKL VISION S.R.L., Altamura (IT)

(72) Inventors: Daniele Barattini, Altamura (IT); Luca Oronzo Greco, Altamura (IT)

(73) Assignee: LOKHEN S.R.L., Altamura (IT)

( * ) Notice: Subject to any disclaimer, the term of this patent is extended or adjusted under 35 U.S.C. 154(b) by 286 days.

(21) Appl. No.: 17/162,458

(22) Filed: Jan. 29, 2021

(65) Prior Publication Data

US 2021/0237695 A1 Aug. 5, 2021

(30) Foreign Application Priority Data

Jan. 30, 2020 (IT) .................. 102020000001807

(51) Int. Cl.
*B60T 3/00* (2006.01)
(52) U.S. Cl.
CPC ..................................... *B60T 3/00* (2013.01)
(58) Field of Classification Search
CPC ......................................................... B60T 3/00
USPC ......................................................... 188/32
See application file for complete search history.

(56) References Cited

U.S. PATENT DOCUMENTS

| | | | |
|---|---|---|---|
| 1,525,742 A | 2/1925 | Israel | |
| 3,858,690 A * | 1/1975 | Facemire | B60T 3/00 188/32 |
| 4,140,206 A * | 2/1979 | Yamazaki | B60T 3/00 188/32 |
| 2012/0181121 A1* | 7/2012 | Bailey | B60T 3/00 188/32 |
| 2018/0178764 A1 | 6/2018 | Nu | |

FOREIGN PATENT DOCUMENTS

| | | | |
|---|---|---|---|
| DE | 3636355 A1 * | 5/1988 | |
| DE | 202016005023 U1 * | 3/2017 | |
| GB | 616423 A * | 1/1949 | |
| GB | 1193638 A * | 6/1970 | |
| JP | S52167737 U | 12/1977 | |
| WO | WO-2004002795 A1 * | 1/2004 | B60T 3/00 |

OTHER PUBLICATIONS

Italian Search Report for IT Patent Application No. 2020000001807, dated Jul. 23, 2020, 2 pages.

* cited by examiner

*Primary Examiner* — Melanie Torres Williams
(74) *Attorney, Agent, or Firm* — Armstrong Teasdale LLP

(57) ABSTRACT

A folding wheel chock has a stop ramp having a front face shaped to interface with a vehicle wheel, extending from a first support base to a first vertex, and a support wall extending from a second support base to a second vertex. The stop ramp and the support wall are hinged by a pivot pin at the respective first and second vertexes to rotate between an in-use or working configuration and a non-use or resting configuration. The folding wheel chock has a tip acting as a portion of the first interface with the vehicle wheel, the tip associated with the stop ramp and movable from an extracted or working configuration, in which it protrudes towards an associable wheel as an extension of the stop ramp, to a retracted or resting configuration in which it is arranged at least partially folded or aligned on the stop ramp and/or support wall.

15 Claims, 8 Drawing Sheets

FOLDING WHEEL CHOCK FOR INDUSTRIAL AND/OR COMMERCIAL VEHICLES

CROSS-REFERENCE TO RELATED APPLICATION

This application claims priority to and benefit of Italian Patent Application No. 102020000001807 filed Jan. 30, 2020, the contents of which are incorporated by reference in their entirety.

FIELD OF THE INVENTION

The present invention relates to a folding wheel chock for vehicles, in particular for industrial and/or commercial vehicles.

BACKGROUND OF THE INVENTION

It is known that wheel chocks, i.e., wheel wedges, which are placed at the wheels of a vehicle and/or a trailer to prevent movement due, for example, to the presence of even a slight slope, are frequently used in the transport sector.

Wheel chocks are components subject to high mechanical stress because they must withstand heavy loads of several tons and are normally exposed to the action of atmospheric elements.

Indeed, wheel chocks are not normally kept in the driver's cab of the vehicle; on the contrary, they are placed on the trailer, in a substantially vertical position, at least partially housed in special structures called chock racks, usually fixed to the frame of the vehicle.

The chocks, which are provided in pairs on each vehicle, must be both light-weight and strong. They must be light-weight because they are repeatedly handled by drivers; therefore, they must also meet ergonomic criteria.

At the same time, they must be strong to avoid risk of accidental breakage, even under full load, and of unintentional movements of the vehicle and/or of the trailer.

Obviously, these two requirements are antithetical, since it is necessary to limit resistant sections, thicknesses, and connections/walls between the support elements to reduce weight, but it is also necessary to increase them to increase strength. Last but not least, the chocks must be affordable.

Various plastic chocks solutions have been developed by injection molding in the prior art to achieve the aforesaid advantages.

In this manner, cost-effective and sufficiently light-weight solutions are obtained, but often at the expense of mechanical strength and, above all, durability.

Indeed, even if, on the one hand, known solutions made of plastic material satisfy the type-approval criteria required for these devices, on the other hand, also because of unfavorable environmental conditions both of work and preservation of the chocks, they rapidly lose their mechanical properties and tend to deteriorate prematurely.

Furthermore, there is an undisputed technical problem related to the overall dimensions of the chocks, because, especially for large-diameter wheels, the chocks may have considerable overall dimensions and, therefore, they cannot be housed inside the vehicle cab, but, as mentioned, they are placed in special external chock racks, usually in a vertical position.

The exterior positioning has further disadvantages. On the one hand, the chocks are continually exposed to atmospheric elements, which accelerate aging and replacement thereof. On the other hand, the chocks are often stolen, as they are easy to remove.

Solutions of at least partially folding chocks have been provided in the prior art to reduce the dimensions of the chocks when they are not in use. Such solutions provide the presence of movable parts that may be at least partially folded on the body of the chock to reduce the overall dimensions in rest condition, flattening the shape as much as possible with respect to the operational configuration of the chock.

Known solutions are not particularly reliable and durable because, as mentioned, the wheel chock is highly biased in use and the presence of movable parts weakens the mechanical strength thereof, unless thickeners and reinforcements are introduced, which would increase weight and cost compared to known solutions of the "fixed" or non-folding type.

Such cost and weight increases are not acceptable in the commercial vehicle equipment sector.

SUMMARY OF THE INVENTION

Therefore, a need is felt to overcome the above-mentioned drawbacks and limitations.

In particular, the need is felt to provide a wheel chock that, on the one hand, is strong, reliable, and durable and, on the other hand, has reduced dimensions so that it can also be housed in the cab (when not in use), without increasing cost and weight.

This need is met by a folding wheel chock as described and claimed herein.

BRIEF DESCRIPTION OF THE DRAWINGS

Further features and advantages of the present invention will be more comprehensible from the following description of preferred embodiments given by way of non-limiting examples, in which.

Elements or parts in common to the embodiments described will be indicated hereafter with the same reference numerals.

DETAILED DESCRIPTION

Figure 1:
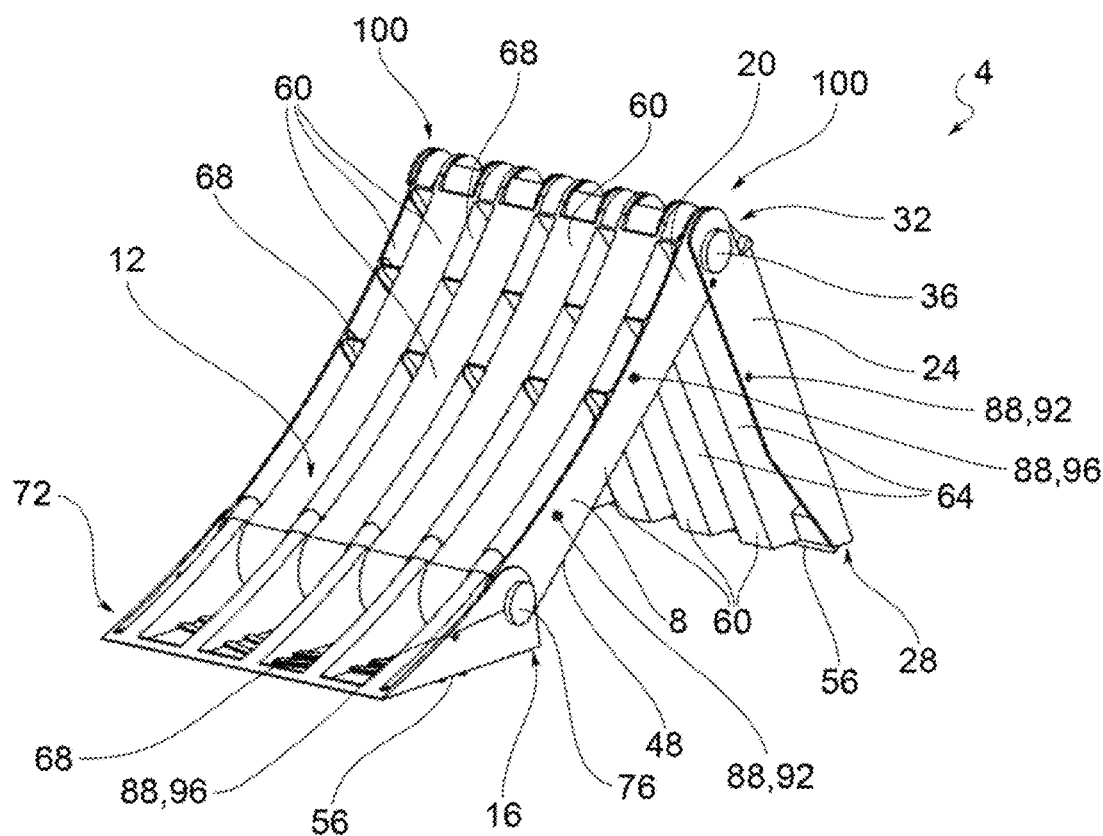
FIG. 1 depicts a front perspective view of a wheel chock according to an embodiment of the present invention in open or working configuration.

With reference to the figures, reference numeral 4 diagrammatically indicates, as a whole, a wheel chock or wedge for trucks or similar commercial and/or industrial vehicles, according to the present invention.

The wheel chock 4 comprises a stop ramp 8 having a front face 12 shaped to be interfaced with a vehicle wheel, extending from a first support base 16 to a first vertex 20.

The front face 12 may be flat or may have a concave pattern to facilitate blocking of the vehicle wheel resting on it.

The wheel chock 4 further comprises a support wall 24, extending from a second support base 28 to a second vertex 32.

The stop ramp 8 and the support wall 24 are hinged by at least one pivot pin 36 at the respective first and second vertexes 20,32, so that they can rotate between an in-use or working configuration, in which the stop ramp 8 and the support wall 24 form a wedge or bridge-shaped structure tapering towards the pivot pin 36, and a non-use or resting configuration in which the stop ramp 8 and the support wall 24 are arranged mutually parallel.

In other words, the stop ramp 8 and the support wall 24 rotate about the pivot pin to assume two different configurations: an in-use or working configuration and a non-use or resting configuration. In the in-use or working configuration, the wheel chock assumes the larger configuration in which it is arranged in a "V" or bridge shape with the first and second support bases 16,28 on the ground and the pivot pin 36 on the opposite side. In such a configuration, the stop ramp 8 forms an inclined surface, which opposes advancing or climbing of a vehicle wheel, by virtue of a wedge effect. In contrast, in the non-use or resting configuration, the stop ramp 8 and the support wall 24 can be mutually rotated so that they are arranged mutually parallel. Such a configuration is also the configuration of the minimum dimension and allows the wheel chock 4 to be stored in a special chock rack or even inside the vehicle cab.

At the second vertex 32, the support wall 24 has at least one abutment 40 shaped to create a limit stop and a support against a corresponding stop 44 of the stop ramp 8, opposite to the front face 12 of the stop ramp 8. In other words, the stop 44 is located on a rear face 48 of the stop ramp, opposite to the front face 12. The rear face 48 is directly facing the bearing surface or ground of the wheel chock 4.

The abutment 40 of the support wall 24 is preferably arranged on an upper edge 52 of the support wall 24 opposite to the second support base 28.

The abutment 40 and the stop 44 are mutually countershaped. They may comprise flat surfaces, which are parallel to each other in a mutual contact configuration.

The stop ramp 8 and/or the support wall 24 are mechanically connected to each other exclusively at the respective first and second vertexes 20,32, by the pivot pin 36, to be free from mechanical connections on the side of the support bases 16,28.

In other words, in the in-use or working configuration, there are no tie-rods, bases, or other connecting elements between the stop ramp 8 and the support wall 24 other than the pivot pin 36.

Preferably, the abutment 40 is located below the pivot pin 36, on the side of the respective support bases 16,28.

The stop 44 on the stop ramp 8 is shaped to offload, through the abutment 40, the thrust it receives from the wheel on the second support base 28.

In other words, the vehicle wheel resting on the front face 12 of the stop ramp 8 applies a thrust which is transmitted by the contact between the stop 44 and the abutment 40. Such a contact is offloaded on the second support base 28 and tends to maintain the bridge configuration of the wheel chock 4. Furthermore, the thrust on the second support base 28 blocks the support wall 24 in place, which does not tend to spread apart with respect to the stop ramp 8.

Thus, the stop ramp 8 is blocked in place by the load applied by the wheel of the vehicle being supported; this load is partially transmitted to the support wall 24 by virtue of the contact between the stop 44 and the abutment 40. The load transmitted in this manner strengthens and digs the second support base 28 onto the ground, also by virtue of the respective fastening element 56. In this manner, each element of the wheel chock 4 is blocked in place and no mechanical connection elements (such as plates, cables, or tie-rods) are required between the stop ramp 8 and the support wall 24, other than the pivot pin 36.

Preferably, the second support base 28 comprises a fastening element 56 to the ground, which protrudes at least partially from the second support base 28 to promote blocking of the support wall 24 to the ground, and thus of the wheel chock 4.

According to an embodiment, the first support base 16 comprises a fastening element 56 to the ground, which protrudes at least partially from the first support base 16 to promote blocking of the stop ramp 8 to the ground.

The fasteners 56 may be in one piece with respective first and second support bases 16,28.

The fasteners 56 may be connected to and integrally associated with the respective first and second support bases 16,28. The term "connected" means that the plate or fastener can be, for example, welded, screwed, embedded, and riveted to the respective support base.

The fasteners 56 may be metal material plates. In this manner, it is possible to employ a different material from that of the stop ramp 8 and the support wall 24 which may be more suited for blocking the respective support bases 16,28 to the ground.

According to an embodiment, the stop ramp 8 has a structure made of ribs 60, alternating with recesses 64, along a transverse direction T-T parallel to the pivot pin 36.

According to an embodiment, the stop ramp 8 comprises at least one reinforcing crosspiece 68, arranged parallel to the transverse direction T-T, connecting the ribs 60 with one another.

Reinforcing crosspieces 68, inclined or oblique with respect to the transverse direction T-T, may be provided.

According to an embodiment, the support wall 24 has a structure made of ribs 60, alternating with recesses 64, along a transverse direction T-T parallel to the pivot pin 36.

According to an embodiment, the support wall 24 comprises at least one reinforcing crosspiece 68, arranged parallel to the transverse direction T-T, connecting said ribs 60 with one another.

Reinforcing crosspieces 68, inclined or oblique with respect to the transverse direction T-T, may be provided.

According to an embodiment, the ribs 60 and the recesses 64 of the stop ramp 8 and the support wall 24 are transversely and mutually offset to allow insertion of the ribs 60 of the stop ramp 8 into the recesses 64 of the support wall 24, in a wheel chock closing configuration 4 in which the stop ramp 8 and the support wall 24 are folded mutually parallel.

In other words, in such an embodiment, the ribs 60 of the stop ramp 8 at least partially penetrate the recesses 64 of the support wall and vice versa: in this manner, it is possible to compact the wheel chock 4 as much as possible in a closed configuration, since the stop ramp 8 and the support wall 24 at least partially penetrate each other.

According to a possible embodiment, the wheel chock 4 comprises a tip 72 which acts as a first interface portion with the motor vehicle wheel. First interface portion means that it is the first portion of the wheel chock 4 that is interfaced with the motor vehicle wheel when in use. In other words, after having positioned the wheel chock 4 near the wheel of the motor vehicle to be blocked, the advancing wheel initially crushes at least partially the tip 72 before resting stably against the front face 12 of the stop ramp 8. As soon as the wheel crushes the tip 72, a block is automatically created that prevents accidental displacement and/or closing of the stop ramp, since the wheel itself, by its own weight, blocks the wheel chock in place on the ground.

In particular, the tip 72 is associated with the stop ramp 8 at the first support base 16 thereof and is movable from an extracted or working configuration, in which it protrudes towards the associable wheel as an extension of the stop ramp, on the side opposite to the support wall 24, to a retracted or resting configuration in which it is arranged at least partially folded or aligned on the stop ramp 8 and/or the support wall 24.

Figure 5:
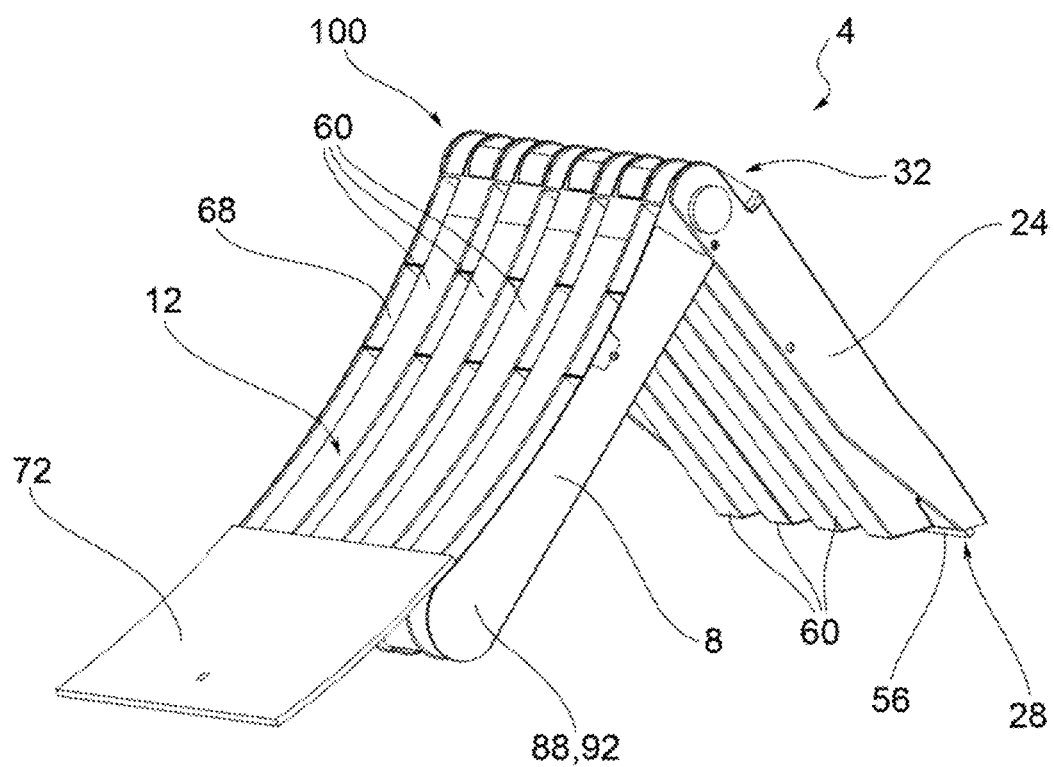
FIG. 5 depicts a front perspective view of a wheel chock according to a further embodiment of the present invention in an open or working configuration.
Figure 6:
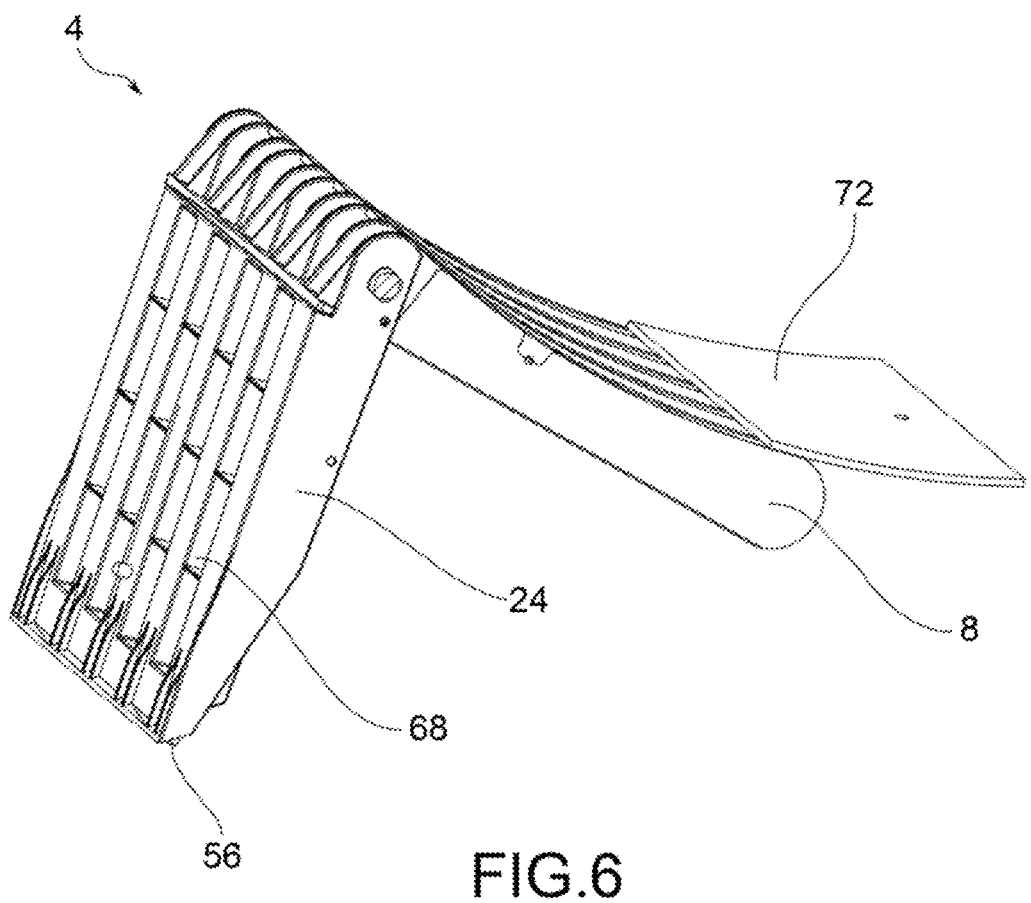
FIG. 6 depicts a rear perspective view of the wheel chock in FIG. 5, in an open or working configuration.
Figure 7:
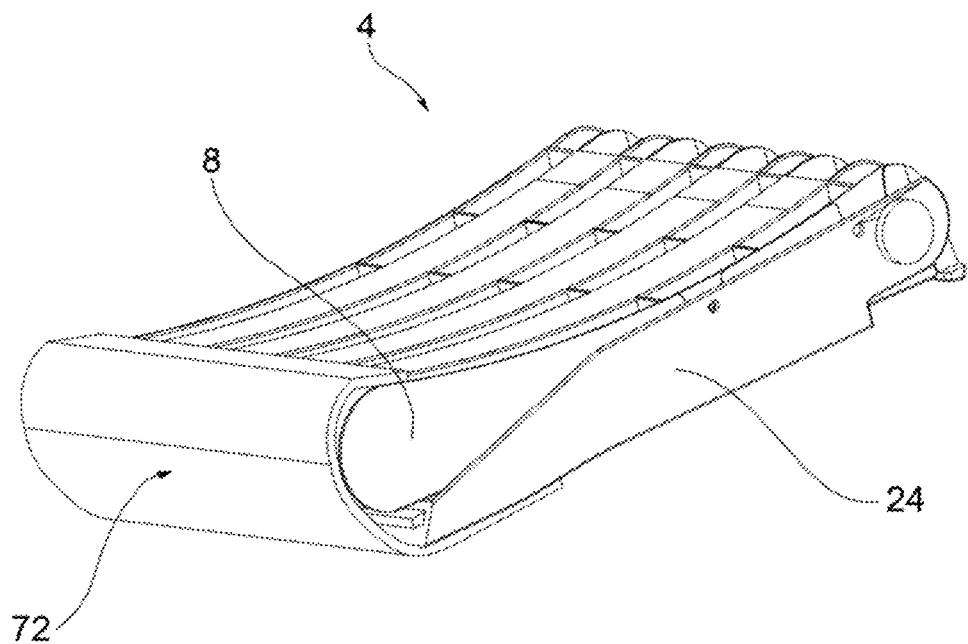
FIG. 7 depicts a front perspective view of the wheel chock in FIG. 5 in a closed or resting configuration.
Figure 8:
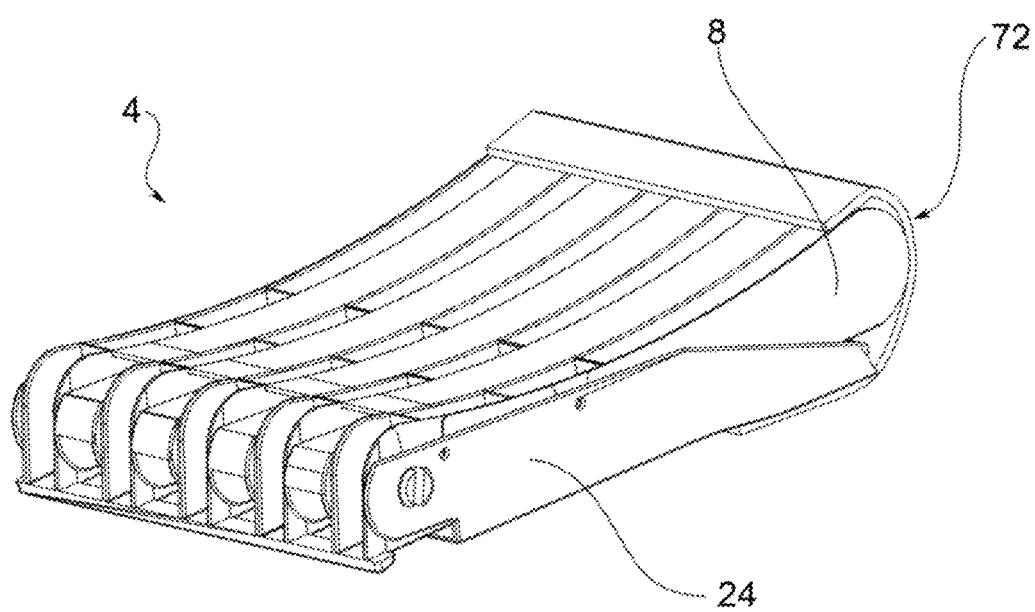
FIG. 8 depicts a rear perspective view of the wheel chock in FIG. 5, in a closed or resting configuration.

According to an embodiment, the tip 72 is an element made of a flexible material and at least partially foldable around the stop ramp 8 and/or the support wall 24, as shown in FIGS. 5-8.

The tip 72 may be made of polymer, plastic, and similar materials adapted to allow bending/curving of the tip.

The tip 72 may also be made of a rigid or semi-rigid material, e.g. plastic and/or metal.

According to a further embodiment (not shown), the tip 72 is at least partially retractable within a relative seat of the stop ramp 8.

According to a possible embodiment, the tip 72 is hinged to the stop ramp 8 at the first support base 16 thereof.

Figure 2:
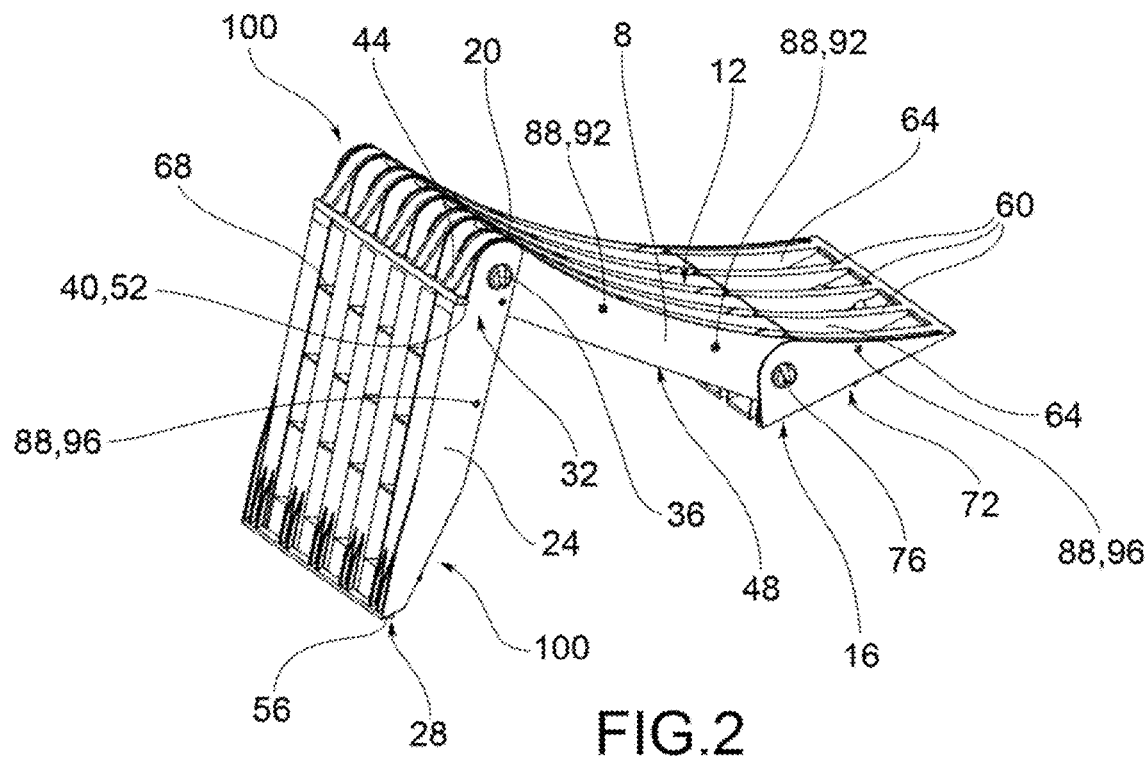
FIG. 2 depicts a rear perspective view of the wheel chock in FIG. 1, in an open or working configuration.
Figure 3:
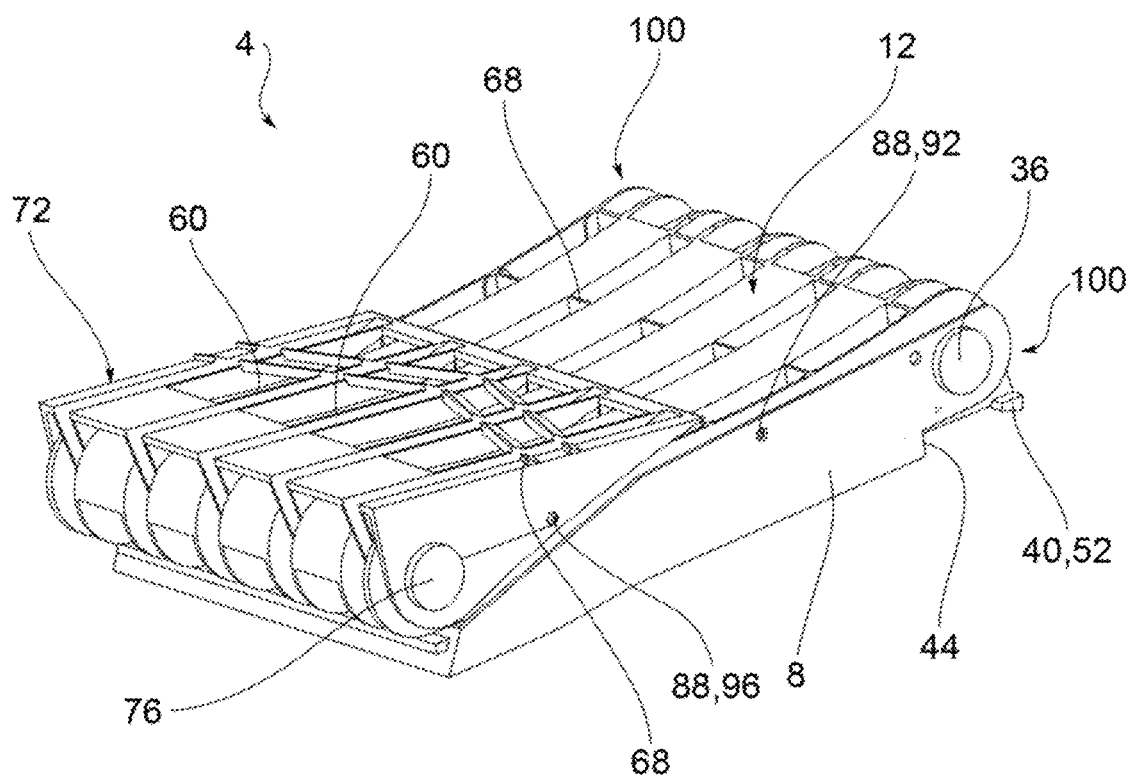
FIG. 3 depicts a front perspective view of the wheel chock in FIG. 1 in a closed or resting configuration.
Figure 4:
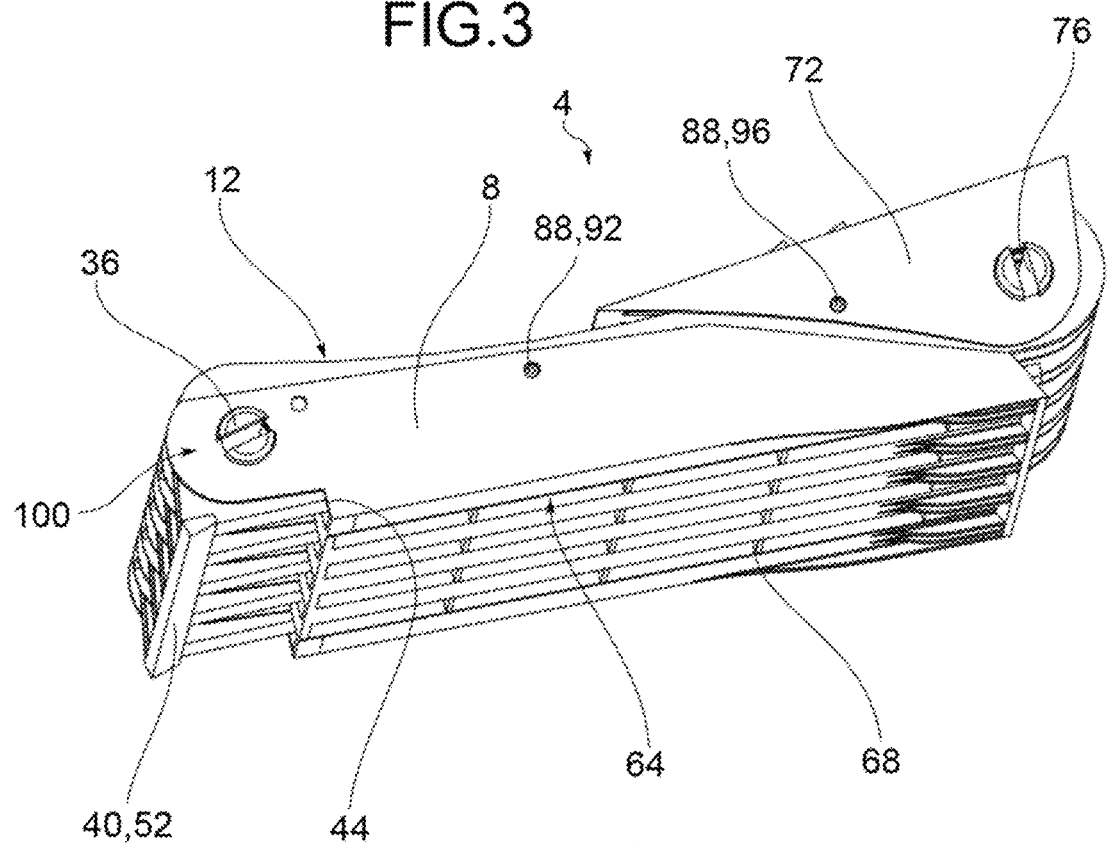
FIG. 4 depicts a rear perspective view of the wheel chock in FIG. 1, in a closed or resting configuration.
Figure 9:
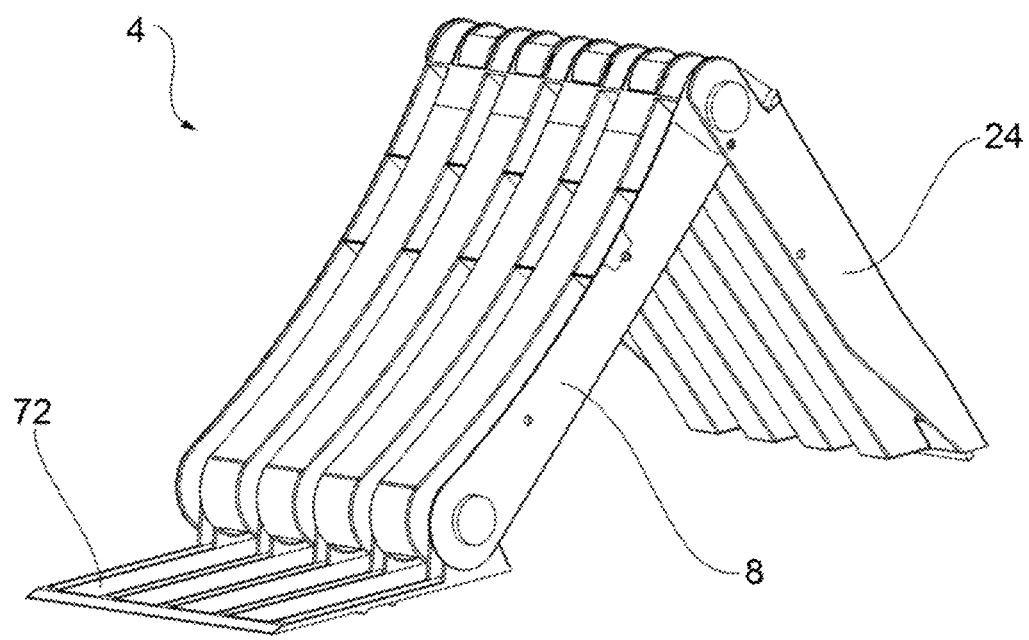
FIG. 9 depicts a front perspective view of a wheel chock according to a further embodiment of the present invention in an open or working configuration.
Figure 10:
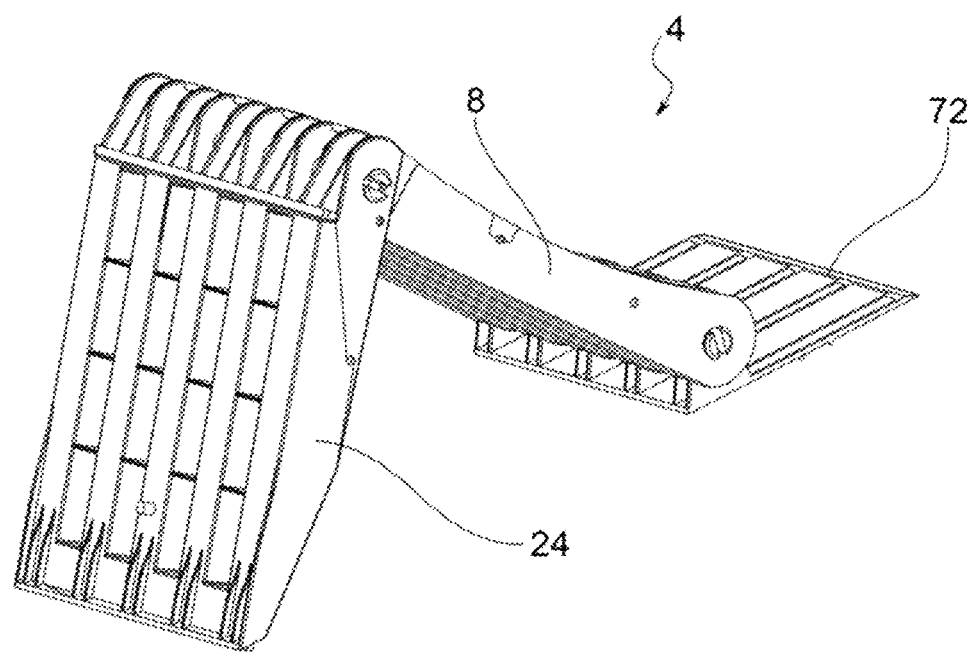
FIG. 10 depicts a rear perspective view of the wheel chock in FIG. 9, in an open or working configuration.
Figure 11:
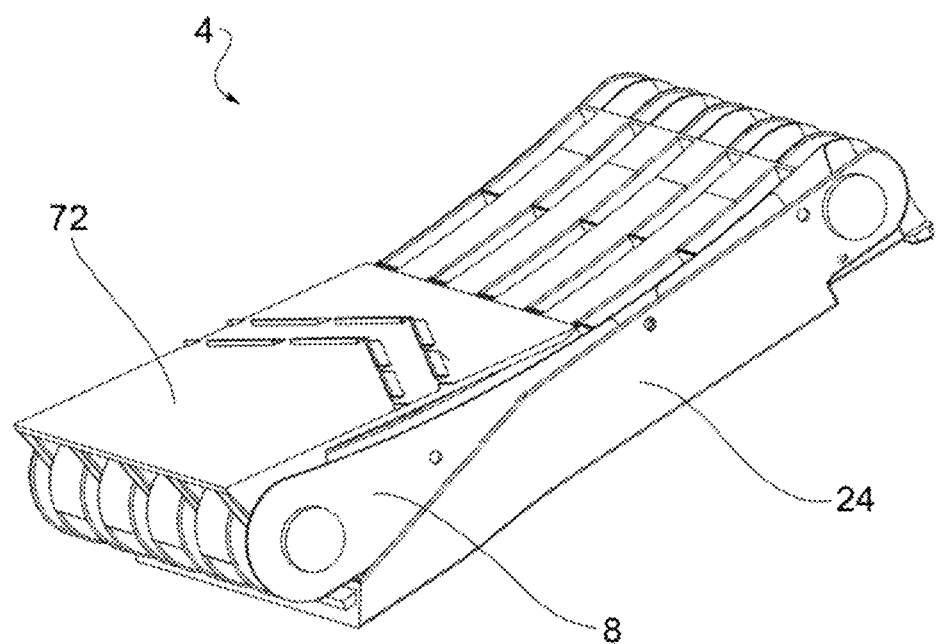
FIG. 11 depicts a front perspective view of the wheel chock in FIG. 9 in a closed or resting configuration.
Figure 12:
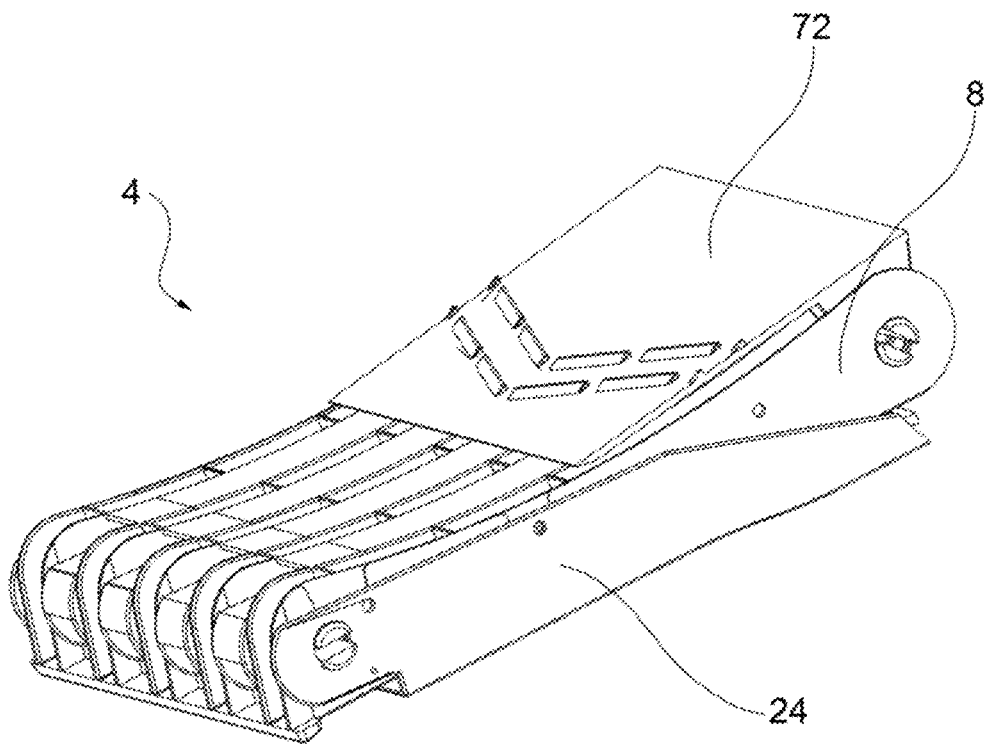
FIG. 12 depicts a rear perspective view of the wheel chock in FIG. 9, in a closed or resting configuration.
Figure 13:
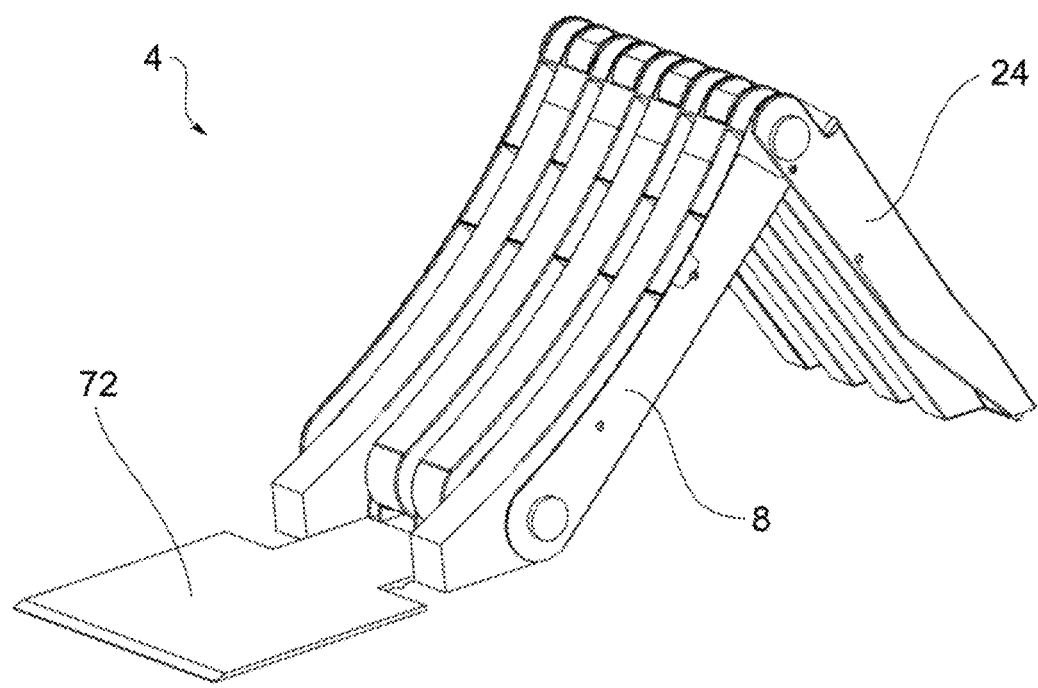
FIG. 13 depicts a front perspective view of a wheel chock according to a further embodiment of the present invention in an open or working configuration.
Figure 14:
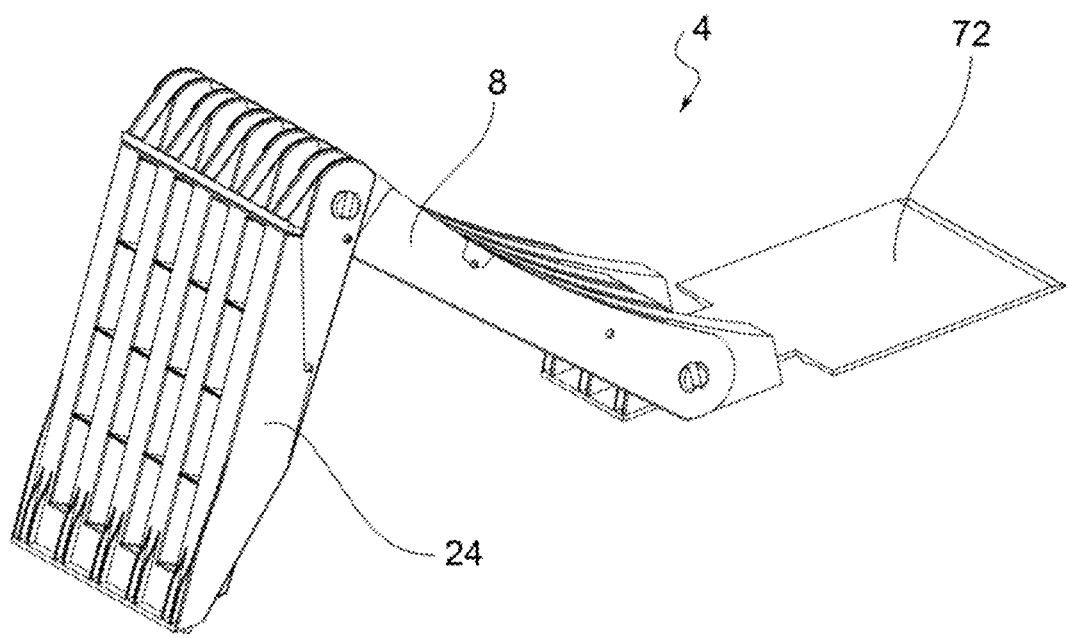
FIG. 14 depicts a rear perspective view of the wheel chock in FIG. 13, in an open or working configuration.
Figure 15:
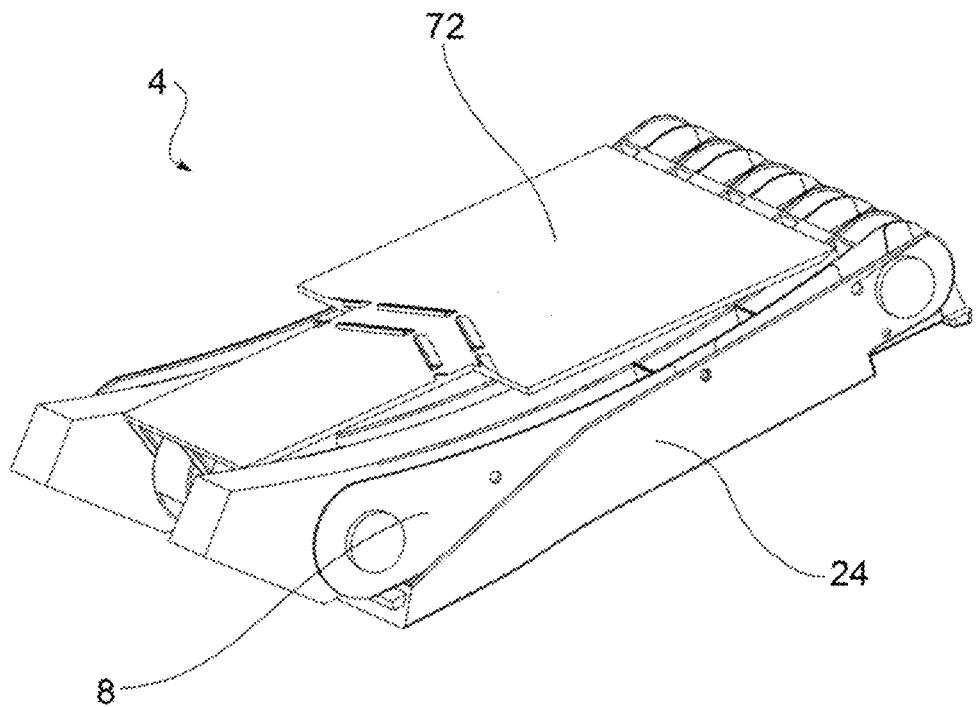
FIG. 15 depicts a front perspective view of the wheel chock in FIG. 13 in a closed or resting configuration.
Figure 16:
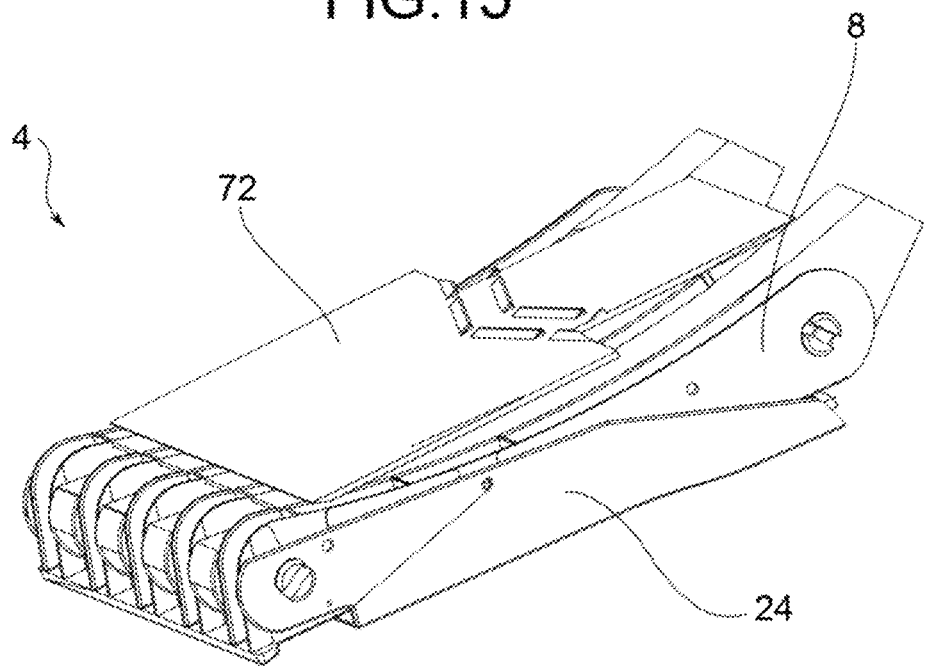
FIG. 16 depicts a rear perspective view of the wheel chock in FIG. 13, in a closed or resting configuration.

In particular, the tip 72 is hinged to the stop ramp 8 by a second pivot pin 76 parallel to the pivot pin 36, configured to allow the tip 72 to be folded onto the stop ramp 8 from the side of the front face 12 of the stop ramp 8 (FIGS. 1-4, 9-16).

Preferably, the tip 72 has a structure made of ribs 60, alternating with recesses 64, along a transverse direction parallel to the pivot pin 36.

Preferably, the ribs 60 and the recesses 64 of the stop ramp 44 and the tip 72 are transversely and mutually offset to allow the ribs 60 of the stop ramp 44 to be inserted into the recesses 64 of the tip 72, in a wheel chock closing configuration 4 in which the tip 72 is folded over the stop ramp 8 from the side of the front face 12 thereof, and wherein the support wall 24 is folded over the stop ramp 8 from the side of the lower or rear face 48 thereof, opposite to the front face 12 thereof.

According to an embodiment, the support wall 24, at the second vertex 32, has a plurality of reinforcing ribs 84 at the pivot pin 36, the reinforcing ribs 84 extending along a prevalent longitudinal direction L-L, parallel to the support wall 24 and perpendicular to the pivot pin 36.

The materials of the wheel chocks 4 described above may be various; preferably, but not exclusively, the stop ramp 8 and/or the support wall 24 are made of plastic material.

According to a possible embodiment, the stop ramp 8 and the support wall 24 are provided with blocking means 88 which comprise at least one peg 92 adapted to be interfaced with a respective seat 96 (at least partially counter-shaped with respect to the peg 92). Typically, the blocking means 88 are arranged along an edge or side wall 100 of the stop ramp 8 and the support wall 24 to align and mutually interpenetrate when the wheel chock 4 is positioned in a closed or resting configuration. Indeed, in such a resting configuration, the respective side walls 100 of the stop ramp 8 and the support wall 24 are mutually aligned to allow positive coupling, i.e. the insertion of the peg 92 into the respective seat 96. Obviously, the peg 92 and the seat 96 are associated one with the stop ramp 8 and the other with the support wall 24 or vice versa. It is sufficient for the blocking means 88 to comprise a single pair of a peg 92 and a seat 96, at a single side wall 100, but more may be provided.

The blocking means 88 may also be provided between the tip 72 and the stop ramp 8.

By virtue of the blocking means 88 the wheel chock 4 can be stored without the risk of accidentally "opening".

The operation, i.e. the opening/closing method, of a wheel chock according to the present invention will now be described.

In particular, when not in use, the wheel chock may be stored in a folded configuration, with the stop ramp 8 and the support wall 24 arranged in contact, parallel to each other. The tip, if provided, will be arranged, in turn, parallel to the stop ramp.

Thus, in a closed configuration, the wheel chock 4 assumes a flat, particularly compact configuration and may, for example, be stored inside the vehicle cab.

In general, in the folded or resting configuration, the wheel chock 4 has a dimension equal to about half of its size in the in-use configuration.

If necessary, the wheel chock may be "opened" by arranging the stop ramp 8 and the support wall 24 in a working configuration, i.e. in a wedge shape, until the abutment 40 of the support wall 24 and the stop 44 of the stop ramp 8 are in mutual contact.

The wheel chock 4 is now operational. If the wheel of the vehicle approaches the stop ramp 8, the weight of the wheel blocks the stop ramp 8 (possibly provided with its own fastening element 56) in place.

At the same time, the weight of the wheel is at least partially offloaded onto the support wall 24 through the interfacing between the stop 44 of the stop ramp 8 and the abutment 40 of the support wall 24.

In this manner, the support wall 24 is, in turn, anchored to the ground by virtue of its own fastening element 56. In this manner, there is no possibility of the wheel chock "opening" under the thrust of the wheel, which, on the contrary, helps to keep it in operating position. Furthermore, as previously described, this configuration requires no mechanical connection elements, such as plates, cables, or tie-rods, between the stop ramp 8 and the support wall 24, other than the pivot pin 36.

Furthermore, as soon as the wheel crushes the tip 72, a block preventing accidental displacement and/or closing of the stop ramp 4 is automatically created, since the wheel, by its own weight, blocks the wheel chock 4 in place on the ground. By virtue of this feature, there is no need for intermediate connections between the stop ramp 8 and the support wall 24, i.e. there is no need for rods or chains to prevent the spreading or angular closing between the stop ramp 8 and the support wall 24.

As can be appreciated from the above detailed description, the wheel chocks according to the present invention overcome the drawbacks described in the prior art.

In particular, the present invention provides a mechanically strong and durable wheel chock.

The wheel chock of the present invention is neither more expensive nor heavier than the equivalent "fixed", non-folding, solutions of the prior art and, at the same time, is lighter and less expensive than known folding solutions.

The wheel chock according to the present invention in a folded configuration has a significantly reduced volume and may be easily stored inside the cab or passenger compartment of the vehicle.

The wheel chock of the present invention is particularly light, also by virtue of the fact that it is completely free from the base, i.e. of the ground connection element between the ramp (which is abuttingly interfaced with the tire) and the back or rear surface.

The geometric structure with ribs ensures that the wheel chock meets the requirements and demands for strength and mechanical resistance.

The wheel chock of the present invention, in a closed or folded configuration, has a particularly compact structure, which may be easily stored inside the cab of the vehicle. This also prevents the wheel chock from being exposed to the elements when not in use (increasing the actual life thereof) and from being removed by third parties.

In order to meet contingent, specific needs, those skilled in the art may make several changes and variations to the solutions of the wheel chocks described above, without thereby departing from the scope of protection as described and claimed herein.

What is claimed:

1. A folding wheel chock comprising:
   a stop ramp having a front face shaped to be interfaced with a vehicle wheel, extending from a first support base to a first vertex, and
   a support wall, extending from a second support base to a second vertex,
   wherein the stop ramp and the support wall are hinged by at least one pivot pin at the respective first and second vertexes to rotate between an in-use or working configuration, in which the stop ramp and the support wall form a wedge or bridge-shaped structure tapering towards the at least one pivot pin, and a non-use or resting configuration in which the stop ramp and the support wall are arranged mutually parallel,
   wherein at the second vertex, the support wall has at least one abutment shaped to create a limit stop and a support against a corresponding stop of the stop ramp, opposite to said front face, the second support base comprises a fastening element to the ground, the fastening element at least partially protruding from the second support base to promote blocking of the support wall to the ground, and the folding wheel chock comprises a tip acting as a portion of a first interface with the vehicle wheel, said tip being moveable relative to the stop ramp at the first support base and being movable from an extracted or working configuration, in which it protrudes towards an associable wheel as an extension of the stop ramp, on a side opposite to the support wall, to a retracted or resting configuration in which it is arranged at least partially folded or aligned on the stop ramp and/or the support wall.

2. The folding wheel chock of claim 1, wherein said tip is an element made of flexible material and at least partially foldable around the stop ramp and/or the support wall.

3. The folding wheel chock of claim 1, wherein said tip is at least partially retractable within a respective seat of the stop ramp.

4. The folding wheel chock of claim 1, wherein said tip is hinged to the stop ramp at the first support base.

5. The folding wheel chock of claim 4, wherein the tip is hinged to the stop ramp by a second pivot pin parallel to said at least one pivot pin, configured to allow the tip to be folded onto the stop ramp from a side of the front face of the stop ramp.

6. The folding wheel chock of claim 1, wherein the stop ramp and the support wall are mechanically connected to each other exclusively at the respective first and second vertexes, by said at least one pivot pin, to be free from mechanical connections on a side of the first and second support bases.

7. The folding wheel chock of claim 1, wherein the at least one abutment of the support wall is arranged on an upper edge of the support wall opposite to the second support base, and wherein the at least one abutment and the stop are mutually counter-shaped.

8. The folding wheel chock of claim 1, wherein said at least one abutment is located below the at least one pivot pin, on the side of the respective first and second support bases.

9. The folding wheel chock of claim 1, wherein the stop on the stop ramp is shaped to offload, through the at least one abutment, a thrust it receives from the vehicle wheel on the second support base.

10. The folding wheel chock of claim 1, wherein the stop ramp and the support wall have a structure made of ribs alternating with recesses, along a transverse direction (T-T) parallel to the at least one pivot pin.

11. The folding wheel chock of claim 10, wherein the ribs and the recesses of the stop ramp and the support wall are transversely and mutually offset to allow insertion of the ribs of the stop ramp into the recesses of the support wall and vice versa, in a wheel chock closing configuration in which the stop ramp and the support wall are folded mutually parallel.

12. The folding wheel chock of claim 10, wherein the tip has a structure made of ribs alternating with recesses, along the transverse direction (T-T) parallel to the at least one pivot pin, and wherein the ribs and the recesses of the stop ramp and the tip are transversely and mutually offset to allow the ribs of the stop ramp to be inserted into the recesses of the tip, in the wheel chock closing configuration in which the tip is folded over the stop ramp from the side of the front face, and wherein the support wall is folded over the stop ramp from a side of a lower or rear face, opposite to the front face.

13. The folding wheel chock of claim 1, wherein the support wall, at the second vertex, comprises a plurality of reinforcing ribs at the at least one pivot pin, said plurality of reinforcing ribs extending along a prevalent longitudinal direction (L-L), parallel to the support wall and perpendicular to the at least one pivot pin.

14. The folding wheel chock of claim 1, wherein the stop ramp and the support wall are provided with blocking means comprising at least one peg adapted to be interfaced with a respective seat, said blocking means being arranged along an edge or side wall of the stop ramp and the support wall, to align and interpenetrate with each other when the wheel chock is positioned in a closing or resting configuration.

15. The folding wheel chock of claim 1, wherein the stop ramp and the tip are provided with blocking means comprising at least one peg adapted to be interfaced with a respective seat, said blocking means being arranged along the edge or side wall of the stop ramp and the support wall, to align and interpenetrate with each other when the folding wheel chock is positioned in the closing or resting configuration.

* * * * *